United States Patent [19]

Mori

[11] 4,436,551

[45] Mar. 13, 1984

[54] PROCESS FOR MAKING STEEL FROM DIRECT-REDUCED IRON

[75] Inventor: Takashi Mori, Niihama, Japan

[73] Assignee: Sumitomo Heavy Industries, Ltd., Tokyo, Japan

[21] Appl. No.: 434,455

[22] Filed: Oct. 15, 1982

[30] Foreign Application Priority Data

Oct. 26, 1981 [JP] Japan ............................ 56-171103
Jan. 26, 1982 [JP] Japan ............................ 57-11680

[51] Int. Cl.³ .......................... C21C 5/28; C21C 5/52
[52] U.S. Cl. ........................................ 75/12; 75/38; 75/46
[58] Field of Search ............... 75/38, 36, 11, 12, 46; 266/173

[56] References Cited

U.S. PATENT DOCUMENTS

| | | | |
|---|---|---|---|
| 2,045,639 | 6/1936 | Eulenstein et al. | 75/38 |
| 4,002,465 | 1/1977 | Brusa | 75/11 |
| 4,304,597 | 12/1981 | Keran et al. | 75/36 |

FOREIGN PATENT DOCUMENTS 1196184 6/1970 United Kingdom .................. 75/36

Primary Examiner—M. J. Andrews
Attorney, Agent, or Firm—Flynn, Thiel, Boutell & Tanis

[57] ABSTRACT

In a steelmaking process wherein direct-reduced iron is manufactured in a reducing furnace and smelted in an electric furnace or a converter, a method is disclosed in which a heating furnace is provided at the lower end of a hood connected so as to enclose the product outlet of the reducing furnace. In one embodiment, a screen is provided within the hood for classifying the reduced material discharged from the product outlet of the reducing furnace into reduced iron and undersized particles, the undersized particles being removed for recycling. The reduced iron is charged into the heating furnace and melted, and is taken out as molten pig iron by a ladle. The molten pig iron within the ladle is charged into the electric furnace by manipulating a crane used to transport the ladle.

17 Claims, 4 Drawing Figures

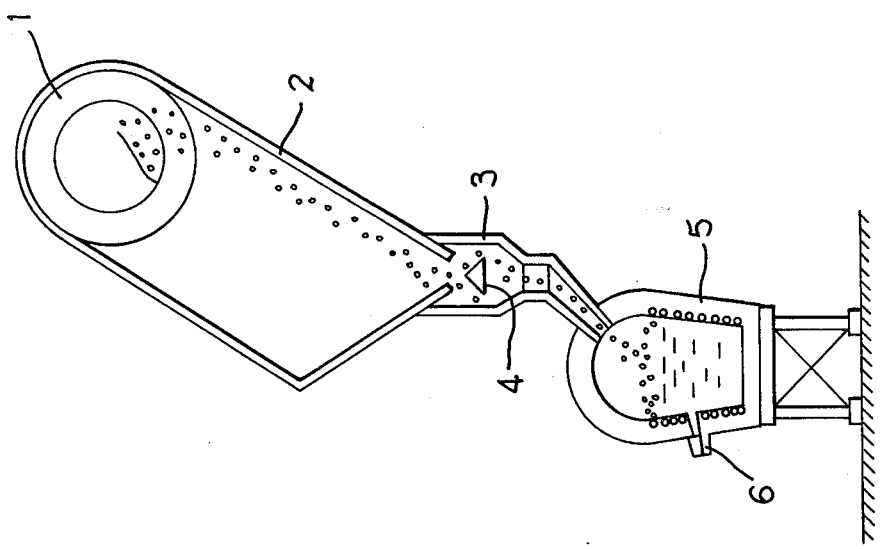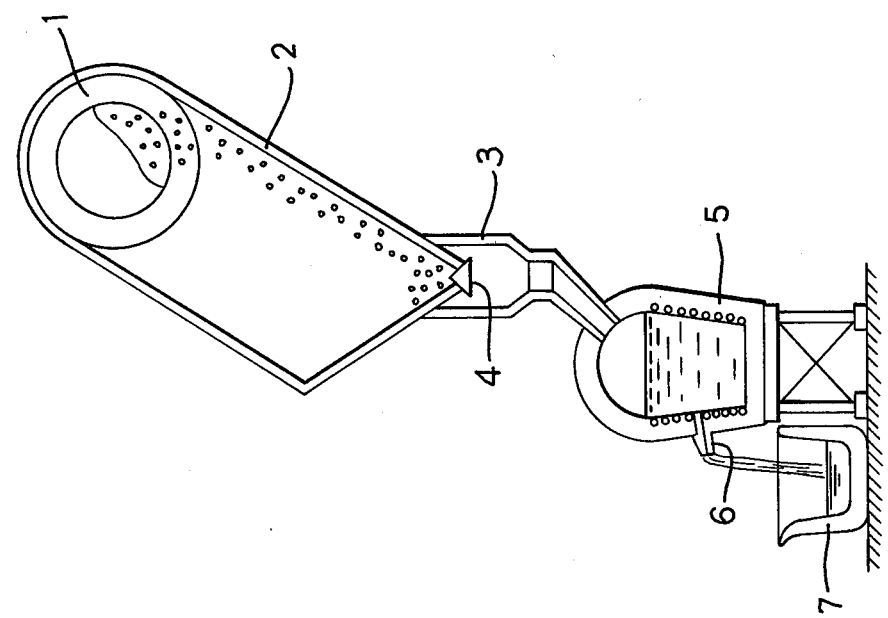

PROCESS FOR MAKING STEEL FROM DIRECT-REDUCED IRON

This invention relates to an improved method for treating direct-reduced iron (DRI) to facilitate charging of same into an electric furnace or a Bessemer-type converter. This invention is used as part of a steelmaking process in which direct-reduced iron is manufactured in a direct-reduction furnace and then is smelted in an electric furnace or a converter.

In a process for preparing direct-reduced iron, an iron oxide-containing starting material, which has been formed into pellets by a pelletizer, is preheated by a preheater and then is charged into the inlet of a reducing furnace, such as a rotary kiln, together with a solid reductant, such as coal or coke, and a desulfurizing agent, such as limestone or dolomite. Rotation of the reducing furnace causes the charged materials to travel toward the outlet of the reducing furnace. The carbon component of the added coal or coke and the oxygen in the iron oxide-containing starting material react chemically, thereby reducing the iron oxide-containing starting material to form metallic iron.

In the prior art, the metallized iron pellets reduced in this manner are cooled in a cooler and then are charged into an electric furnace or a converter. Because this procedure causes a great loss of thermal energy, a recent practice has been to take the direct-reduced iron pellets out of the reducing furnace, load them into an air-tight hot container and convey the loaded container by a conveying means, such as a crane, to a separately located electric furnace and then charge the pellets into the furnace. This latter method is advantageous because energy is conserved. However, because the bulk density of the direct-reduced iron pellets (about 1.4 metric tons per cubic meter) is low in comparison with the specific gravity of molten steel (about 7.5), a container having a large volumetric capacity is needed to convey the direct-reduced iron pellets to make up a charge for the smelting furnace. Moreover, because the direct-reduced iron pellets leave the reducing furnace at a high temperature, about 1050° C., when they are loaded into the container for being conveyed to the smelting furnace, an agglomeration phenomenon occurs, wherein the direct-reduced iron pellets in the lower layers in the container partially melt and bond with each other within the container, so that it may not be possible to discharge some of the lower layers of the direct-reduced iron pellets from the container.

The process of the invention pertains to a process employing pellets of direct-reduced iron prepared in the same manner as described above, using a reducing furnace, such as a rotary kiln. For example, the pellets of direct-reduced iron can be prepared by the process disclosed in Japanese patent application Ser. Nos. 33616/81 and 100986/81, and U.S. patent application Ser. No. 354,337, filed Mar. 3, 1982, the entire contents of these applications being incorporated by reference in the present application.

In the process of the present invention, the direct-reduced iron pellets mixed with char are charged directly from the reduction furnace into a heating furnace, for example, an induction heating furnace, and are melted therein. The carbon is thereby fused and alloyed with the direct-reduced iron, with the result being that the melting temperature within the heating furnace can be reduced, for example, to about 1250° C., thereby reducing the power consumption.

In the present invention, the heating furnace is located at and communicates with the lower end of a substantially air-tight hood, which hood is connected to and encloses the product outlet of the reducing furnace. The direct-reduced iron pellets produced in the reducing furnace flow directly into and through the hood and thence are charged directly into the heating furnace while the direct-reduced iron pellets are still at substantially the same high temperature that they had when they were discharged from the reducing furnace. The direct-reduced iron pellets are melted within the heating furnace, and then the molten pig iron is removed from the heating furnace by means of a ladle. The molten pig iron is then transported in the ladle and is charged into a separately located smelting furnace where it is smelted. Conventional refining methods are then used to obtain a desired product, such as steel.

In a second embodiment of the invention, a screen is provided within the hood for effecting hot screening of the direct-reduced iron pellets discharged from the reducing furnace whereby to separate undersize reduced iron particles and undersize residual reductant material from the hot pellets, so that most of the excess reductant can be recycled for reuse in the reducing furnace and the undersize reduced iron particles can be recycled to the pelletizer. An intermediate closeable chamber is positioned between the hood and the heating furnace. The intermediate chamber is selectively openable at its opposite ends whereby to communicate with the hood and the heating furnace, respectively. It is particularly advantageous to employ a screen within the hood, according to the second embodiment of the invention, when the coal or coke reductant used in the reducing furnace is of low reactivity so that a large quantity thereof must be used for the reduction reaction in the reducing furnace.

According to the invention, it is possible to make effective use of the heat content of the direct-reduced iron pellets discharged from the reducing furnace and to convey the direct-reduced iron to the smelting furnace in an efficient manner. Furthermore, it is possible to charge the molten pig iron into the smelting furnace after performing a step of removing the slag that floats on the surface of the molten pig iron when it is in the ladle that has received the molten pig iron from the heating furnace. Thus, the amount of gangue contained in the molten pig iron charged to the smelting furnace is reduced, which reduces the energy requirements of the smelting furnace. In addition, because the melting temperature can be lowered owing to the incorporation of the carbon in the molten pig iron charged into the smelting furnace, smelting can be carried out in a very efficient manner.

BRIEF DESCRIPTION OF THE DRAWINGS

The drawings illustrate two preferred embodiments of systems for practicing the present invention. In the drawings:

FIG. 1 illustrates a first embodiment in the state in which the reduced iron pellets are being charged from the reducing furnace into the heating furnace.

FIG. 2 illustrates the first embodiment in the state in which the molten pig iron is being charged from the heating furnace into a ladle.

Figure 3:
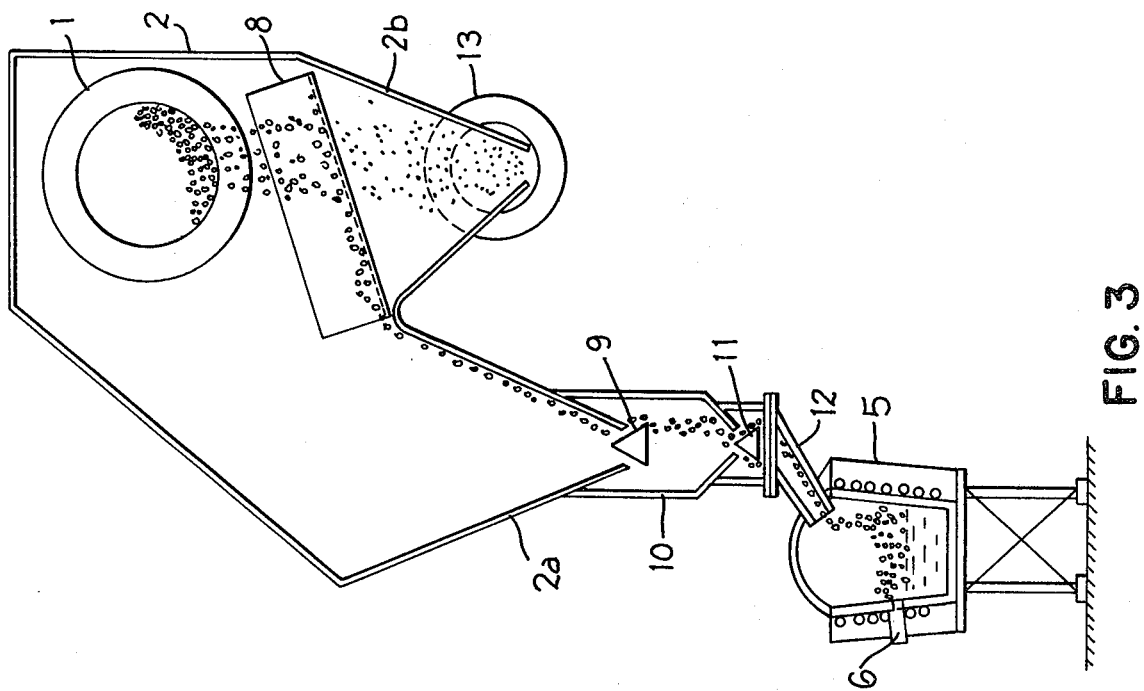
FIG. 3 and FIG. 4 show the same operations, respectively, for the second embodiment which utilizes a screen within the hood.

The present invention has been developed in order to solve the aforementioned problems encountered in the prior art, and will be described hereinafter with reference to two illustrative preferred embodiments.

In the first embodiment of the invention, as shown in FIGS. 1 and 2, reference number 1 denotes a reducing furnace for producing direct-reduced iron pellets, which furnace is a rotary kiln in the present embodiment. A substantially air-tight hood 2 is provided and it encloses the product outlet end of the rotary kiln 1. The pellets of direct-reduced iron discharged from the furnace 1 are deposited onto the downwardly inclined lower wall of the hood 2 and move downwardly therealong. The lower portion of the hood 2 is constructed in the shape of a downwardly converging hopper having a closeable opening at its lower end. A valve element 4, here a vertically movable conical plug, is provided to selectively close the opening in the lower end of the hopper of the hood 2. A chute 3 is disposed below and communicates with the lower end of the hood 2 for receiving pellets therefrom when the valve element 4 is in its lower position as shown in FIG. 1. A heating furnace 5, here an induction heating furnace, is provided at the lower end of the chute 3, for receiving the pellets that move downwardly through the chute. The heating furnace 5 has a spout 6 whereby molten pig iron formed in said heating furnace can be flowed into a ladle 7 (FIG. 2). The ladle 7 containing the molten pig iron is then transported by conventional means, such as a crane (not shown), and the molten pig iron is unloaded therefrom and is charged into the smelting furnace.

In the process described above, direct-reduced iron pellets, which have been prepared by being subjected to a prescribed reduction process in the reduction furnace 1, are substantially continuously discharged into the hood 2 from the product outlet of the reduction furnace 1. As shown in FIG. 1, the direct-reduced iron pellets cascade downwardly within the hood 2, pass through the hopper portion of the hood 2 and the chute 3, and then are charged into the heating furnace 5. During this charging step, the valve element 4 is in its lower open position. The successively introduced pellets of direct-reduced iron are melted in the heating furnace 5, which is in its heated state. When the proper amount of reduced iron pellets has been charged into the furnace 5, the valve element 4 is closed until complete melting and discharging of the molten pig iron from the furnace 5 has been accomplished, as shown in FIG. 2. Closing the valve element 4 seals off the interior of the hood 2 whereby to prevent reoxidation of the reduced iron. Because the operation of the heating furnace 5 is a batch operation and because pellets are more or less continuously discharged from the reducing furnace 1, when the valve 4 is closed, pellets will accumulate within the lower portion of the hood 2.

The molten pig iron in the heating furnace 5 is poured into the ladle 7 from the spout 6 of the heating furnace 5. The ladle is then conveyed to a separately located smelting furnace by a conveying apparatus, such as a crane, and the molten pig iron is then charged into the smelting furnace.

In the foregoing operation, the iron oxide-containing starting material is charged into the rotary kiln 1 together with a carbonaceous material, employed as a reductant, as described above. Although a major part of the carbonaceous material is consumed in the reduction reaction that takes place in the kiln 1, the residual unreacted carbonaceous material, in the form of char, is discharged with the pellets through the product outlet of the kiln 1. The amount of this discharged char is usually not large. For example, the results of experiments show that when coal coke is used as the reducing agent in the production of direct-reduced iron, the amount of char contained in the product discharged from the kiln outlet is 8.8% by weight. The char and the pellets are directly introduced into the heating furnace and are melted therein. As the result, the molten pig iron contains 4.3% by weight of carbon.

Figure 4:
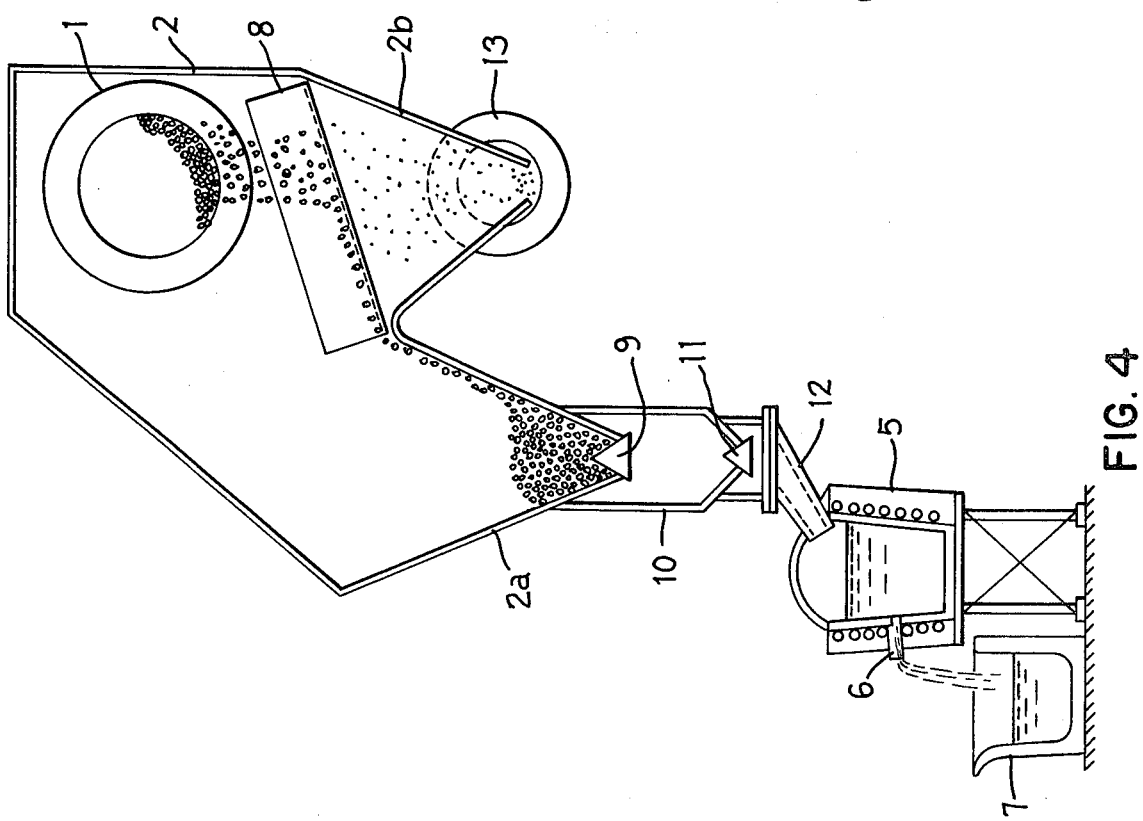

In the second embodiment of the present invention, as shown in FIGS. 3 and 4, reference numeral 1 denotes a rotary kiln, and reference numeral 2 denotes a substantially air-tight hood provided so as to enclose the product outlet end of the rotary kiln 1. The hood 2 contains an inclined screen 8 which is positioned directly beneath the product outlet of the rotary kiln 1. The hood 2 is further shaped to provide two separate, downwardly converging hopper sections 2a, 2b. The hopper section 2a is located below and frontwardly of the lower end of the screen 8 so as to receive the pellets discharged from the lower end of said screen. The hopper section 2b is located directly below the screen 8. The screen 8 is inclined at an angle so that its lower end adjoins the corresponding upper edge of the hopper 2a. At the lower end of hopper 2a there is provided a closeable chamber 10 having a vertically movable valve element 9 provided at the upper end thereof for controlling the flow of material from the hopper 2a into the chamber 10. A chute 12 is connected to the lower end of the closeable chamber 10. A vertically movable valve element 11 is provided in the upper end of the chute 12 for selectively closing the opening at the bottom of the chamber 10. The lower end of the chute 12 extends into the upper portion of the heating furnace 5. A cooler 13 is located at the lower end of the hopper 2b for the purposes of receiving and cooling the excess reductant, in the form of char, and any undersize reduced iron particles which have fallen through the screen 8.

In the foregoing second embodiment of the present invention, direct-reduced iron pellets which have been metallized by a prescribed reduction process in the rotary kiln 1, are discharged together with reductant from the product outlet of the rotary kiln 1 onto the screen 8. The screen 8 separates the direct-reduced iron pellets from separable undersize particles, including reductant particles and undersize direct-reduced iron particles. The direct-reduced iron pellets, separated from the undersize particles in this fashion, move downwardly along the screen 8 and are charged into the hopper 2a. When the valve elements 9 and 11 are open, the pellets are loaded into the heating furnace 5 by flowing from the open lower end of the hopper 2a through the chamber 10 and the chute 12, in that order. At this time the heating furnace 5, which is in the heated state, melts the successively added direct-reduced iron pellets as shown in FIG. 3. When a predetermined quantity of the reduced iron has been loaded into the heating furnace 5, the valve elements 9,11 are closed until the charged direct-reduced iron pellets have been melted and the thus-formed molten pig iron has been loaded into a ladle 7 as described below and illustrated in FIG. 4. Closing the valve elements 9 and 11 seals off the interior of the chamber 10 and hood 2 to prevent reoxidation of the reduced iron.

The molten pig iron in the heating furnace 5 is loaded into a ladle 7 which has been carried and set before the pouring spout 6 of the heating furnace 5 by means of a crane or the like, not shown. The ladle 7 is then conveyed to a separate electric furnace or converter by the crane, and the molten pig iron within the ladle is then charged into the electric furnace or converter. The valve elements 9 and 11 can be reopened to reinitiate the process when the desired amount of molten pig iron has been discharged from the heating furnace 5. During the process, the high-temperature undersize particles, including reductant, separated by the screen 8 are cooled in the cooler 13, if necessary, and then are recycled for reuse.

By means of the valve elements 4 or 9 and 11, both embodiments of the invention can be operated continuously by repeating the steps of loading the heating furnace and then melting and discharging the molten pig iron from the heating furnace. Direct-reduced iron pellets are accumulated in the respective hopper sections during the period when the pellets are not being fed into the heating furnace.

The embodiments of the invention in which an exclusive property or privilege is claimed are defined as follows:

1. In a process for manufacturing steel in which an iron oxide-containing starting material is heated and reduced with a solid, carbon-containing, reducing agent in a reducing furnace to form pellets of direct-reduced metallic iron mixed with char, and then said direct-reduced metallic iron is smelted in a separate smelting furnace to form said steel, the improvement which comprises: discharging said pellets of direct-reduced metallic iron mixed with char from the outlet of said reducing furnace into a hood which provides a substantially airtight enclosure around said reducing furnace outlet, then feeding said pellets mixed with an amount of char sufficient to form pig iron when said char is melted with said pellets from said hood into a heating furnace while said pellets remain at substantially the same high temperature that they had when they were dischaged from said reducing furnace and while said pellets are protected from substantial oxidation caused by contact with the ambient air, then melting said pellets mixed with char in said heating furnace to form molten pig iron, then discharging said molten pig iron from said heating furnace into a ladle, and then discharging said molten pig iron from said ladle into said smelting furnace.

2. In a process for manufacturing steel in which an iron oxide-containing starting material is heated and reduced with a solid, carbon-containing, reducing agent in a reducing furnace to form pellets of direct-reduced metallic iron mixed with char, and then said direct-reduced metallic iron is smelted in a separate smelting furnace to form said steel, the improvement which comprises: discharging said pellets of direct-reduced metallic iron mixed with char from the outlet of said reducing furnace into a hood which provides a substantially airtight enclosure around said reducing furnace outlet, depositing said pellets mixed with char onto a screen within said hood and thereby separating undersize particles from the remainder of said pellets, then feeding said remainder of said pellets mixed with an amount of char sufficient to form pig iron when said char is melted with said pellets into a heating furnace while said pellets remain at substantially the same high temperature that they had when they were dischaged from said reducing furnace and while said pellets are protected from substantial oxidation caused by contact with the ambient air, then melting said pellets mixed with char in said heating furnace to form molten pig iron, then discharging said molten pig iron from said heating furnace into a ladle, and then discharging said molten pig iron from said ladle into said smelting furnace.

3. A process according to claim 1, wherein said reducing furnace is a rotary kiln, said smelting furnace is an electric furnace or converter, and said smelting furnace is located spaced from said heating furnace.

4. A process according to claim 2, wherein said reducing furnace is a rotary kiln, said smelting furnace is an electric furnace or converter, and said smelting furnace is located spaced from said heating furnace.

5. A process according to claim 1, wherein said iron-containing starting material is in the form of pellets, and said reducing agent is coal or coke.

6. A process according to claim 2, wherein said iron-containing starting material is in the form of pellets, and said reducing agent is coal or coke.

7. A process according to claim 5, wherein said pellets are removed from said reducing furnace at a temperature of approximately 1050° C., and said reduced iron pellets melt within said heating furnace at a temperature of approximately 1250° C.

8. A process according to claim 6, wherein said pellets are removed from said reducing furnace at a temperature of approximately 1050° C., and said reduced iron pellets melt within said heating furnace at a temperature of approximately 1250° C.

9. A process according to claim 1, including the step of removing a layer of slag from the upper surface of the molten pig iron contained in said ladle before discharging said molten pig iron therefrom.

10. A process according to claim 2, including the step of removing a layer of slag from the upper surface of the molten pig iron contained in said ladle before discharging said molten pig iron therefrom.

11. A process as claimed in claim 2, wherein the improvement further comprises discharging said pellets mixed with char from said reducing furnace outlet downwardly onto said screen, wherein the lower portion of said hood comprises a pair of separate first and second hopper sections, and said screen is set over said first hopper section at an angle such that said remainder of said pellets mixed with char moves downwardly along said screen into said second hopper section and said undersize particles pass through said screen and are deposited into said first hopper section, collecting said undersize particles, and recycling said undersize particles to said reduction furnace.

12. A process as claimed in claim 11, wherein the improvement further comprises (a) flowing said pellets mixed with char downwardly through first valve means at the bottom of said second hopper section into an intermediate sealable chamber, said pellets then passing downwardly through said intermediate chamber and thence through second valve means at the bottom of said intermediate chamber and then passing into said heating furnace; then (b) closing said first and second valve means when the amount of pellets charged into said heating furnace reaches a predetermined level; then (c) melting and then discharging said molten pig iron from said heating furnace into said ladle while accumulating pellets in said second hopper section; then (d) opening said first and second valve means and ceasing discharge of molten pig iron from said heating furnace;

then (e) repeating the above steps (a)–(d) as necessary for continuous operation.

13. A process according to claim 1, wherein the improvement further comprises (a) flowing said pellets mixed with char downwardly through said hood, the lower portion of said hood comprising a hopper section, thence through valve means at the bottom of said hopper section, and then into said heating furnace; then (b) closing said valve means when the amount of pellets charged into said heating furnace reaches a predetermined level; then (c) melting and then discharging said molten pig iron from said heating furnace into said ladle while accumulating pellets in said hopper section; then (d) opening said valve means and ceasing discharge of molten pig iron from said heating furnace; then (e) repeating the above steps (a)–(d) as necessary for continuous operation.

14. A process according to claim 1, wherein the heating furnace is an induction heating furnace.

15. A process according to claim 2, wherein the heating furnace is an induction heating furnace.

16. A process according to claim 1, wherein said molten pig iron contains about 4.3 weight percent carbon.

17. A process according to claim 2, wherein said molten pig iron contains about 4.3 weight percent carbon.

* * * * *